(12) United States Patent
Castelino

(10) Patent No.: US 7,349,346 B2
(45) Date of Patent: Mar. 25, 2008

(54) METHOD AND APPARATUS TO MODEL ROUTING PERFORMANCE

(75) Inventor: Manohar R. Castelino, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 1060 days.

(21) Appl. No.: 10/286,641

(22) Filed: Oct. 31, 2002

(65) Prior Publication Data

US 2004/0085911 A1   May 6, 2004

(51) Int. Cl.
H04L 12/26 (2006.01)
H04L 12/28 (2006.01)
G06F 15/173 (2006.01)

(52) U.S. Cl. .............. 370/252; 370/351; 370/395.31; 709/224; 709/238

(58) Field of Classification Search ............ 370/252, 370/351, 395.31; 709/224, 238
See application file for complete search history.

(56) References Cited

U.S. PATENT DOCUMENTS

| | | | |
|---|---|---|---|
| 5,343,465 A * | 8/1994 | Khalil ................ 370/232 |
| 5,572,512 A * | 11/1996 | Cutler et al. ............ 370/248 |
| 5,649,108 A * | 7/1997 | Spiegel et al. .......... 709/241 |
| 5,898,595 A * | 4/1999 | Bair et al. ................. 716/2 |
| 5,909,440 A * | 6/1999 | Ferguson et al. ........ 370/389 |
| 6,266,706 B1 * | 7/2001 | Brodnik et al. .......... 709/242 |
| 6,728,214 B1 * | 4/2004 | Hao et al. ............... 370/241 |
| 6,925,063 B2 * | 8/2005 | Goldshtein et al. ...... 370/252 |
| 6,950,405 B2 * | 9/2005 | Van Gerrevink ........ 370/252 |
| 7,206,289 B2 * | 4/2007 | Hamada .................. 370/252 |
| 2002/0141378 A1 * | 10/2002 | Bays et al. .............. 370/351 |
| 2002/0150041 A1 * | 10/2002 | Reinshmidt et al. ..... 370/216 |
| 2002/0174246 A1 * | 11/2002 | Tanay et al. ............ 709/238 |
| 2003/0012141 A1 * | 1/2003 | Gerrevink ............... 370/250 |
| 2003/0202512 A1 * | 10/2003 | Kennedy ................ 370/389 |
| 2003/0214913 A1 * | 11/2003 | Kan et al. ............... 370/252 |

* cited by examiner

Primary Examiner—Alpus H. Hsu
(74) Attorney, Agent, or Firm—Kacvinsky, LLC

(57) ABSTRACT

A method and apparatus to model routing in a network are described wherein a data test route table (DTRT) is created from a route table, a stream of packets to test the DTRT is generated, and the DTRT is tested using the stream of packets. Other embodiments are described and claimed.

25 Claims, 3 Drawing Sheets

METHOD AND APPARATUS TO MODEL ROUTING PERFORMANCE

BACKGROUND

A network device such as a router may be designed to route packets of information through a network. In some instances, there may be a need to model the performance of a router. This may be appropriate, for example, to test router performance as implemented in an actual network. Conventional modeling techniques, however, may be unsatisfactory. For example, conventional modeling techniques may not use an actual routing table to model performance. Rather, they may make certain assumptions regarding a network and implement those assumptions using static packet sizes and routes. Furthermore, they may take these results and attempt to extrapolate theoretical worst and best case performance. The assumptions and extrapolations may introduce error into performance results. Consequently, there may be a need for improved performance modeling techniques for network devices.

BRIEF DESCRIPTION OF THE DRAWINGS

The subject matter regarded as embodiments of the invention is particularly pointed out and distinctly claimed in the concluding portion of the specification. Embodiments of the invention, however, both as to organization and method of operation, together with objects, features, and advantages thereof, may best be understood by reference to the following detailed description when read with the accompanying drawings in which:

DETAILED DESCRIPTION

Figure 1:
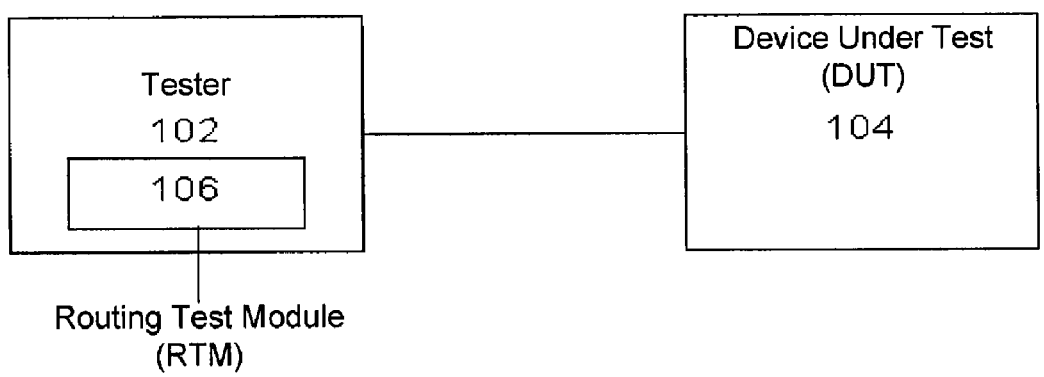
FIG. 1 is a block diagram of a performance modeling system in accordance with one embodiment of the invention.

Embodiments of the invention may comprise a method and apparatus to model performance of a router. The embodiments may be used to determine performance characteristics of forwarding implementations by modeling test systems using real world route tables (RWRT). A RWRT may be referred to herein as a route table for a network device, including a current route table implemented or to be implemented on a core or edge router, for example. The performance measurements thus obtained correspond to actual performance achievable by the routing implementation in a typical environment. This is in contrast to conventional performance measuring techniques, which may rely upon theoretical extrapolations using best and worst-case test results.

The embodiments may represent an improvement for a number of reasons. For example, the modeling may obtain a non-extrapolated measure of device performance in real world situations. The modeling may take into account the randomness of the Internet Protocol (IP) address distribution of the current Internet, which may adversely affect the trie building and lookup algorithms used by specific routers. In addition, the traffic generation algorithm used to test the route table takes into account subnet sizes and distributions and generates traffic patterns that can exercise each subnet. Further, the modeling may also determine suitability of a particular forwarding implementation for special cases, like edge or core routers.

One embodiment of the invention may model routing performance by normalizing a relatively large RWRT down to smaller subsets that can be exercised by one or more traffic testers. The embodiment attempts to preserve the IP address and prefix distribution of the real world route table on each test interface as well as on the whole test system. The embodiment may then generate traffic to exercise those routes that were selected from the RWRT.

It is worthy to note that any reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Numerous specific details may be set forth herein to provide a thorough understanding of the embodiments of the invention. It will be understood by those skilled in the art, however, that the embodiments of the invention may be practiced without these specific details. In other instances, well-known methods, procedures, components and circuits have not been described in detail so as not to obscure the embodiments of the invention. It can be appreciated that the specific structural and functional details disclosed herein may be representative and do not necessarily limit the scope of the invention.

The various embodiments of the invention, or portions thereof, as described herein may be implemented as software executed by a processor, hardware circuits or structures, or a combination of both. The processor may be a general-purpose or dedicated processor, such as a processor from the family of processors made by Intel Corporation, Motorola Incorporated, Sun Microsystems incorporated and others. The software may comprise programming logic, instructions or data to implement certain functionality for an embodiment of the invention. The software may be stored in a medium accessible by a machine or computer-readable medium, such as read-only memory (ROM), random-access memory (RAM), magnetic disk (e.g., floppy disk and hard drive), optical disk (e.g., CD-ROM) or any other data storage medium. In one embodiment of the invention, the media may store programming instructions in a compressed and/or encrypted format, as well as instructions that may have to be compiled or installed by an installer before being executed by the processor. Alternatively, an embodiment of the invention may be implemented as specific hardware components that contain hard-wired logic for performing the recited functionality, or by any combination of programmed general-purpose computer components and custom hardware components.

Referring now in detail to the drawings wherein like parts are designated by like reference numerals throughout, there is illustrated in FIG. 1 a block diagram of a performance modeling system in accordance with one embodiment of the invention. FIG. 1 illustrates a performance modeling system 100. System 100 may comprise, for example, a tester 102 and a Device Under Test (DUT) 104. The tester 102 may further comprise a Routing Test Module (RTM) module 106.

In one embodiment of the invention, tester 102 may comprise a testing device. Tester 102 may comprise appropriate hardware, software and interfaces to configure and test a network device or simulated network device, such as a core or edge router. For example, tester 102 may include software to model performance of a routing table implemented on DUT 104. In one embodiment of the invention, this software may be collectively referred to herein as RTM 106. In addition, tester 102 may be configured to communicate test information between tester 102 and DUT 104. The test information may comprise, for example, control information and media information. The test information may be communicated between tester 102 and DUT 104 in the form of packets using one or more packet forwarding protocols, such as the Transmission Control Protocol (TCP) as defined by the Internet Engineering Task Force (IETF) standard 7, Request For Comment (RFC) 793, adopted in September, 1981 ("TCP Specification"), and the Internet Protocol (IP) as defined by the IETF standard 5, RFC 791, adopted in September, 1981 ("IP Specification"), both available from "www.ietf.org" (collectively referred to as the "TCP/IP Specification"). Packets may be addressed using any number of protocols, such as the Internet Protocol Version Four (IPv4) addressing identified by the IP Specification, and the IETF Internet Protocol Version Six (IPv6) draft standard, RFC 2460, dated December 1998 ("IPv6 Specification"), also available from "www.ietf.org."

In one embodiment of the invention, DUT 104 may comprise a particular hardware and/or software representation of a network device, including a RWRT. For example, the DUT may be a router having a forwarding plane, control plane and management plane. The control plane may control and configure the forwarding plane, which actually manipulates the network traffic. The control plane may create and maintain the RWRT. The forwarding plane may search for routing information in the RWRT, make decisions based on control information received from the control plane, and perform operations on packets like forwarding, classification, filtering and so forth. The management plane is typically orthogonal and manages the control and forwarding planes. It provides logging and diagnostic capabilities, non-automated configuration like operator intervention, and can activate or deactivate various control and forwarding plane modules.

In one embodiment of the invention, RTM 106 may comprise a software and/or hardware module to implement performance modeling for tester 102 of DUT 104. RTM 106 may attempt to extract one or more finite non-intersecting subset of routes from the RWRT, such that each subset reflects the prefix and IP address distribution found in the RWRT. The extraction results in a Data Test Route Table (DTRT), with the DTRT having one or more subsets, each comprising a defined set of routes. Once the routes for each subset are allocated from the RWRT to the DTRT, traffic patterns may be generated to exercise each subset. Measurement criteria may be defined and compiled during the exercise to gather desired performance information.

In one embodiment of the invention, the particular number of subsets in the DTRT may depend on the number of interfaces to be tested on the DUT. The number of routes present in any particular subset DTRT(i) may depend on the maximum number of unique packets that can be generated per interface on the tester. The routes present in DTRT(i) may be assigned to one or more interfaces of the DUT. Traffic may be generated from tester 102 to exercise these entries. Any remaining routes may be distributed among the test interfaces. These routes may not necessarily be exercised with traffic, but rather may serve to weigh down the route table lookup and storage.

One embodiment of the invention takes as input a RWRT from a network device such as a router, a number of interfaces under test (N), and a number of unique packets/streams that may be supported per interface (D). The output may comprise a DTRT, with a set of routes per interface extracted from the RWRT in accordance with a certain number of parameters. Such parameters may include, for example, making the size of each DTRT subset to equal D and allocating routes to preserve prefix distribution and subnet IP address distribution in each DTRT subset.

The embodiments may be further described with reference to FIGS. 2 and 3 and accompanying examples. Although FIG. 2 as presented herein may include a particular processing logic, it can be appreciated that the processing logic merely provides an example of how the general functionality described herein can be implemented. Further, each operation within a given processing logic does not necessarily have to be executed in the order presented unless otherwise indicated.

Figure 2:
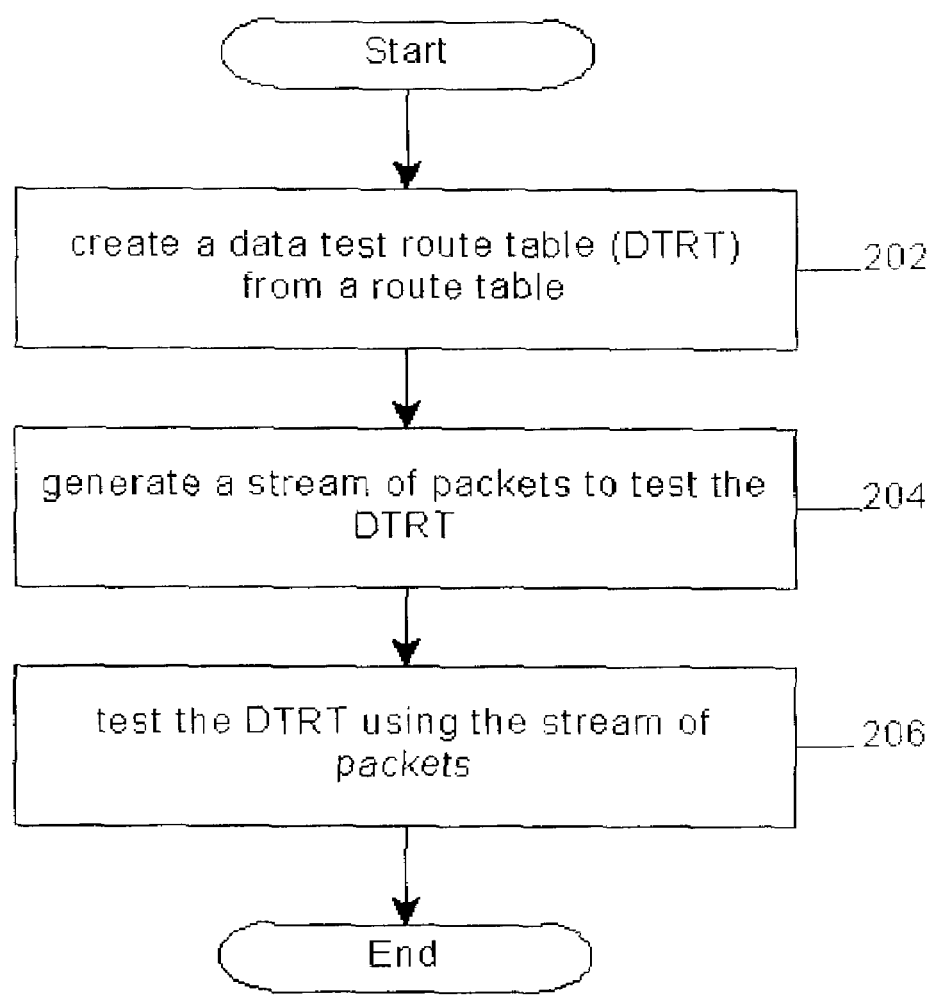
FIG. 2 is a block flow diagram of operations performed by a Routing Test Management (RTM) module in accordance with one embodiment of the invention.

FIG. 2 is a block flow diagram of the operations performed by a RTM in accordance with one embodiment of the invention. In one embodiment of the invention, this and other modules may refer to the software and/or hardware used to implement the functionality for one or more embodiments as described herein. In this embodiment of the invention, for example, these modules may be implemented as part of a processing system. It can be appreciated that this functionality, however, may be implemented by any device, or combination of devices, located anywhere in a test system and still fall within the scope of the invention.

FIG. 2 illustrates a programming logic 200 for a RTM module in accordance with one embodiment of the invention. Programming logic 200 may comprise programming logic to perform performance modeling for a route table. For example, in one embodiment of the invention the route table may be an actual route table taken from an active network device, such as an edge or core router. As shown in programming logic 200, a DTRT may be created from a RWRT at block 202. A stream of packets may be generated to test the DTRT at block 204. The DTRT may be tested using the stream of packets at block 206.

In one embodiment of the invention, a DTRT may be created from a RWRT. The DTRT may represent a part of the RWRT that may be exercised with traffic. Any remaining routes (i.e., RTRT-DTRT) may be used to add volume to the test, but is not necessarily used to pass any traffic. The RTM module may create a DTRT by collecting statistics from the RWRT. The statistics may be used to normalize routes from the RWRT. At least one finite non-intersecting subset of routes may be extracted from the normalized routes. A destination address may then be assigned for each route in each subset.

In one embodiment of the invention, the RWRT statistics may include prefix length distribution and subnet distribution. The distribution percentages may then be used to allocate routes across the various DTRT subsets.

In one embodiment of the invention, the RWRT maybe normalized to eliminate any routes that are not appropriate for the performance modeling. First, a number of determinations may be made. For example, a determination may be made as to the number of interfaces to test. Further, a determination may be made as to the number of streams supported per interface. In addition, a determination may be made as to the number of subnets to be extracted at each prefix length.

Once normalized, a set of routes for a subset may then be selected using the number of interfaces and number of streams per interface. For example, each prefix may be compared with at least one threshold parameter. A prefix may be eliminated based on the comparison.

For example, assume that the number of interfaces is represented by N, the number of streams supported per interface is represented by D, and a number of routes with a prefix P is represented by P_SIZE(P). A route prefix may not make it from the RWRT to the DTRT based on a threshold parameter, as illustrated in the following examples. In a first example, a route prefix may not make it from the RWRT to the DTRT if a prefix percentage is smaller than some number. This may be represented as follows:

If (P_SIZE(P)*(D*N))/R<1 eliminate P, where D*N<R is required

In a second example, a route prefix may not make it from the RWRT to the DTRT is a prefix percentage in the RWRT is large enough to make it from the RWRT to the DTRT but not large enough for each interface level DTRT. This may be represented as follows:

If (P_SIZE(P)*D)/R<1 eliminate P

In one embodiment of the invention, at least one finite non-intersecting subset of routes may be extracted from the normalized routes. In implementation, a plurality of subsets may exist for the DTRT subset, with each subset representing a subset at a prefix level. In one example, a subset may be extracted by determining a number of routes per interface. A number of routes per prefix may be adjusted. Subnets may be reordered within each prefix. A number of routes per prefix may be assigned from the route table to each subset. Any unassigned routes may be distributed across the test interfaces. For example, the unassigned routes may be distributed evenly across the test interfaces to weight down the route table lookup and storage.

Once the DTRT is setup on the DUT, traffic should be generated on each interface in a manner that exercises every data route. There are, however, some routes that may not pass traffic at all due to the Longest Prefix Match (LPM) rule. The LPM rule generally states that routing to all destinations is done on a longest match basis. For example, a router that has to decide between two different length prefixes of the same network should follow the longer mask. Consequently, there are some routes in the RWRT that may not pass traffic since there are more specific routes that draw away its traffic.

Accordingly, one embodiment of the invention may assign a destination address for each route in each subset to reduce this problem. This may be accomplished, for example, by creating a one-bit trie table from the RWRT. The trie table may have an entry representing a route and any untaken branches for the route. A determination may be made as to whether an untaken branch exists. A destination address associated with the untaken branch may be assigned to the route if the untaken branch exists. A destination address may be generated for the route if the untaken branch fails to exist.

The destination address may be generated, for example, from another entry having a destination subnet similar to the entry subnet. Every route in the DTRT may map to a trie entry at a level M, where M is the subnet mask/prefix length. A check may be made to determine whether a branch exists below a given trie entry that is not taken due to the LPM rule, i.e., there is no route entry for a more specific subnet. If such a branch exists, an IP address in the more specific subnet may be used as the destination IP address. If such a branch cannot be found, the IP address of an entry closest to it in terms of prefix length in the DTRT may be used where a destination subnet is found, since such a route is considered unusable for the modeling.

Figure 3:
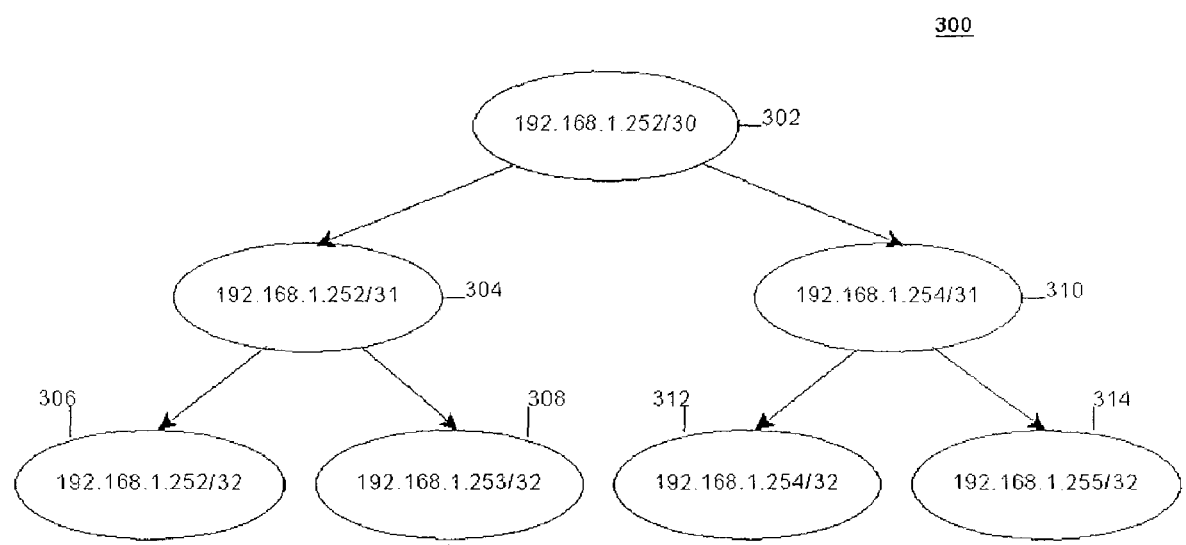
FIG. 3 is a block diagram of a destination address selection model.

The operation of the RTM module, and the processing logic shown in FIG. 3, may be better understood by way of example. Assume as input a RWRT having R entries. A test may be setup with a number of interfaces under test (N) and a number of unique packets/streams that can be supported per interface (P). Assume as output a DTRT and IP traffic packet streams represented as IPSTREAM(I) that can be used to exercise route in subsets DTRT(i) of DTRT.

Assume the following global variables for a pseudo code as follows:

| | |
|---|---|
| maeTotalRoutes | // Total number of routes in the Route Table |
| maeRouteCount | // Array that contains the number of routes in each |
| | // prefix |
| | // maeRouteCount(i) for i = 1 to 32 |
| | // gives the number of routes present with prefix |
| | // length I |
| maeRoute | // Two dimensional array indexed by prefix length |
| | // and route index within the prefix length |
| | // maeRoute(i) (j) where i = 1 to 32 |
| | //                      j = 0 to maeRouteCount(i) |
| | // gives the jth route with prefix I |
| | // This initially contains all the routes from the |
| | // RWRT |
| numberOfTestPorts | // number of test interfaces |
| streamsPerTestPort | // number of unique packets supported per test interface |
| | // face |
| maeTableCompressionFactor | // Compression factor from the RWRT to |
| | // DTRT |

Route table normalization may be performed based on N and P. A prefix may not make it from the RWRT to the DTRT if: (1) the percentage of the prefix in the RWRT is so small that it should not make it from the RWRT to the DTRT for the entire system; and (2) the percentage of this prefix in the RWRT is large enough to make it from the RWRT to the DTRT but should not make it down to each interface level DTRT. This may be accomplished as follows:

```
maeNormalizeRoutes ( ) {
    totalStreams    = numberOfTestPorts * streamsPerTestPort
    recalcNeeded    = true
    while (recalcNeeded == true) {
        recalcNeeded = false
        maeTableCompressionFactor = totalStreams / maeTotalRoutes
        for {i = 1; i <= 32; i++} {
            if { maeRouteCount(i) == 0 } {
                continue
            }
            compressedStreamCount = maeRouteCount(i) * maeTableCompressionFactor
```

```
        if { compressedStreamCount < numberOfTestPorts } {
            if { (maeTotalRoutes - maeRouteCount(i)) == 0 } {
                break
            }
            maeTotalRoutes      = maeTotalRoutes - maeRouteCount(i)
            maeRouteCount(i)    = 0   ;# Start ignoring this mask
            recalcNeeded        = true
        }
    }
  }
}
```

At the end of the normalization operation there remains a route table that retains as much of the IP subnet and prefix distribution as possible given test constraints. There nay be a need, however, to perform some adjustments to route distributions to one or more subsets DTRT(i). This may occur, for example, where the prefix percentages may not map beyond a certain point to an individual DTRT(i). For example, assume each DTRT was to have 100 routes, and the percentage of a prefix in the RWRT is 8.43. Given these assumptions, it may be difficult to map this down to 100 routes. Therefore, another number such as 8 or 9 may be used based on the distribution of the remaining prefixes.

In one embodiment of the invention, adjusting route distribution may be implemented by adjusting the number of routes selected per prefix such that:

$$\Sigma(\text{Prefix}(i) \text{ in a DTRT}(x) \text{ for } i=1 \text{ to } 32) = \text{DTRT Routes Per Interface } (P)$$

This adjustment may result in a maximum of 1 route getting added or deleted for a few prefixes to achieve the desired route distribution. In addition, the IP subnets may be scrambled within every prefix in the RWRT to ensure even distribution of the IP addresses. The scrambling may be performed using, for example, a random number generator. Afterwards, RTM 106 may go through the RWRT and pick up the required number of routes per prefix and assign them to the DTRT for each interface to be tested. The result at this point should be a number of remainder routes defined as RWRT-DTRT. The remainder routes may be distributed across all the interfaces. At the end of this operation all routes from the RWRT should be assigned to the DUT interfaces.

In one embodiment of the invention, adjustment of route distribution may occur as follows:

```
maeDistributeRoutes { } {
    for (i = 1; 1 <= 32; i++) {
        subnetRoutesPerPort(i) =
            (maeRouteCount(i) * maeTableCompressionFactor) / numberOfTestPorts
    }
    roundingFactor          = 0.5
    roundingIncrement       = 0.05  ;# Changing this changes the granularity of the
convergence
    previousRoundingError   = null
    roundingAttempts        = 0
    maxRoundingAttempts     = 1000
    stream                  = 0
    while (roundingAttempts < maxRoundingAttempts) {
        roundingAttempts++
        for (port = 0; port < numberofTestPorts; port++) {
            stream = 0
            for (i = 1; 1 <= 32; i++) {
                for (j = 0; (j + roundingFactor) < subnetRoutesPerPort(i); j++) {
                    stream++
                }
            }
        }
        roundingError = stream - streamsPerTestPort
        if (roundingError == 0) {
            break   ;# We converged
        } elseif (roundingError > 0) {       ;# Positive rounding error
            # if we flipped, move the other way in shorter steps
            if (previousRoundingError == "negative") {
                roundingIncrement   = roundingIncrement / 2
                roundingFactor      = roundingFactor + roundingIncrement
            } else {
                roundingFactor      = roundingFactor + roundingIncrement
            }
            set previousRoundingError "positive"
        } elseif {$roundingError < 0} {      ;# Negative rounding error
            # if we flipped, move the other way in shorter steps
            if {$previousRoundingError == "positive"} {
                roundingIncrement   = roundingIncrement / 2
                roundingFactor      = roundingFactor - roundingIncrement
```

-continued

```
        } else {
            roundingFactor    = roundingFactor − roundingIncrement
        }
        set previousRoundingError "negative"
    }
  }
}
```

In one embodiment of the invention, even subnet redistribution may be implemented using randomization as follows:

```
proc maeScrambleRoutes {} {
    for (mask = 1; mask <= 32; mask++) {
        if { maeRouteCount(mask) == 0 } {
            continue
        }
        # Setup the random seed based on the number of routes
        srandom maeRouteCount(mask)
        for (j = 0; j < maeRouteCount(mask); j++) {
            a = random( ) % maeRouteCount(mask)
            b = random( ) % maeRouteCount(mask)
            maeSwapRoutes a b
        }
    }
}
```

Other more deterministic ways to achieve this even subnet redistribution may involve, for example, the following operations:

1. Plotting the distribution of the subnets within a prefix;
2. Considering thickly populated portions of the plot as filled segments and the other spaces as holes; and
3. Drawing proportional number of subnets from each filled segment in each DTRT subnet.

These operations may rely, however, on the existence of demarcated filled segments. Randomization may not have such a restriction, but may be less deterministic.

Now that the DTRT is setup on the DUT interfaces, traffic may be generated on each interface in a manner that exercises every route or as close to every route in the DTRT as possible. This may pose some challenges. For example, the LPM routing scheme will select the most specific subnet when routing traffic. Consequently, there may be some subnets that cannot pass data due to the fact that there are more specific subnets that draw away its traffic. For example, assume a route in the RWRT and DTRT is identified in accordance with the Classless Interdomain Routing (CIDR). According to CIDR, an IP network may be represented by a prefix. The prefix may be, for example, an IP address and some indication of the leftmost contiguous significant bits within this address. An example of a prefix might be a route subnet/mask, such as 198.32.0.0/16. According to the LPM rule, if there are two other routes subnet.0/mask+1 and subnet.1/mask+1, then traffic will never be sent on the subnet/mask route. Consequently, RTM 106 attempts to find a destination IP address for each and every route in the DTRT. This may be accomplished in order to ensure that every route in the DTRT may be exercised. This may be better illustrated with reference to FIG. 3.

FIG. 3 is a block diagram of a destination address selection model. FIG. 3 illustrates a trie table 300. Trie table 300 may comprise, for example, a number of route entries 302, 304, 306, 308, 310, 312 and 314. Trie table 300 may organize the route entries in a hierarchical manner, with entries having more general prefixes at the top and entries having more specific prefixes towards the bottom of the table. In this example, it can be appreciated that entry 302 having a prefix of 192.168.1.254/31 represents a more general route than entry 312 having a prefix of 192.168.1.254/32. Consequently, since entry 312 is present in the RWRT it will draw traffic away from entry 302 and prevent it from being properly tested. Accordingly, RTM 106 may select a destination IP address for entry 302 using, for example, the destination IP address of entry 314 provided entry 314 is not present in the RWRT.

While certain features of the embodiments of the invention have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

The invention claimed is:

1. A method to model routing in a network, comprising:
creating a data test route table (DTRT) from a route table;
generating a stream of packets to test said DTRT; and
testing said DTRT using said stream of packets;
wherein said creating said DTRT comprises collecting statistics for said route table and normalizing a set of routes for said route table.

2. The method of claim 1, further comprising:
identifying at least one performance criteria for said testing;
measuring said performance criteria during said testing; and
creating a benchmark from said at least one performance criteria.

3. The method of claim 1, wherein said creating said DTRT further comprises:
extracting at least one finite non-intersecting subset of routes from said normalized routes; and
assigning a destination address for each route in each subset.

4. The method of claim 1, wherein said collecting comprises:
determining a prefix length distribution for said route table; and
determining a subnet distribution for said route table.

5. The method of claim 4, wherein said normalizing comprises:
determining a number of interfaces to test;
determining a number of streams supported per interface;
determining a number of subnets to be extracted at each prefix length; and
selecting said set of routes using said number of interfaces and said number of streams per interface.

6. The method of claim 5, wherein said selecting said set of routes comprises:

comparing each prefix with at least one threshold parameter; and eliminating a prefix in accordance with said comparison.

7. The method of claim 6, wherein said DTRT comprises a plurality of subsets, wherein said extracting comprises:
determining a number of routes per interface;
adjusting a number of routes per prefix;
reordering subnets within each prefix; and
assigning said number of routes per prefix from said route table to each subset.

8. The method of claim 7, further comprising distributing any unassigned routes across said number of interfaces.

9. The method of claim 8, wherein said assigning said destination address comprises:
creating a one bit trie table from said route table, with said trie table having an entry representing a route and any untaken branches for said route;
determining whether an untaken branch exists;
assigning a destination address associated with said untaken branch to said route if said untaken branch exists; and
generating a destination address for said route if said untaken branch fails to exist.

10. The method of claim 9, wherein said generating comprises generating a destination address from another entry having a destination subnet similar to said entry subnet.

11. An article comprising:
a storage medium;
said storage medium including stored instructions that, when executed by a processor, result in modeling routing in a network by creating a data test route table (DTRT) from a route table, generating a stream of packets to test said DTRT, and testing said DTRT using said stream of packets, wherein said creating said DTRT comprises collecting statistics for said route table and normalizing a set of routes for said route table.

12. The article of claim 11, wherein the stored instructions, when executed by a processor, further result in identifying at least one performance criteria for said testing, measuring said performance criteria during said testing, and creating a benchmark from said at least one performance criteria.

13. The article of claim 11, wherein the stored instructions, when executed by a processor, further result in extracting at least one finite non-intersecting subset of routes from said normalized routes, and assigning a destination address for each route in each subset.

14. The article of claim 13, wherein the stored instructions, when executed by a processor, farther result in said collecting by determining a prefix length distribution for said route table, and determining a subnet distribution for said route table.

15. The article of claim 14, wherein the stored instructions, when executed by a processor, further result in said normalizing by determining a number of interfaces to test, determining a number of streams supported per interface, determining a number of subnets to be extracted at each prefix length and selecting said set of routes using said number of interfaces and said number of streams per interface.

16. The article of claim 15, wherein the stored instructions, when executed by a processor, further result in said selecting said set of routes by comparing each prefix with at least one threshold parameter, and eliminating a prefix in accordance with said comparison.

17. The article of claim 16, wherein the stored instructions, when executed by a processor, farther result in said DTRT comprising a plurality of subsets, and said extracting is performed by determining a number of routes per interface, adjusting a number of routes per prefix, reordering subnets within each prefix, and assigning said number of routes per prefix from said route table to each subset.

18. The article of claim 17, wherein the stored instructions, when executed by a processor, further result in distributing any unassigned routes across said number of interfaces.

19. The article of claim 18, wherein the stored instructions, when executed by a processor, further result in said assigning said destination address by creating a one bit trie table from said route table, with said trie table having an entry representing a route and any untaken branches for said route, determining whether an untaken branch exists, assigning a destination address associated with said untaken branch to said route if said untaken branch exists, and generating a destination address for said route if said untaken branch fails to exist.

20. The article of claim 19, wherein the stored instructions, when executed by a processor, further result in said generating by generating a destination address from another entry having a destination subnet similar to said entry subnet.

21. A system, comprising:
a computing platform adapted to model routing in a network;
said platform being further adapted to creating a data test route table (DTRT) from a route table, generating a stream of packets to test said DTRT, and testing said DTRT using said stream of packets;
wherein said creating said DTRT comprises collecting statistics for said route table and normalizing a set of routes for said route table.

22. The system of claim 21, wherein said platform is further adapted to identifying at least one performance criteria for said testing, measuring said performance criteria during said testing, and creating a benchmark from said at least one performance criteria.

23. The system of claim 21, wherein said platform is further adapted to extracting at least one finite non-intersecting subset of routes from said normalized routes, and assigning a destination address for each route in each subset.

24. A testing apparatus, comprising:
a tester;
a device under test in communication with said tester, said tester having a routing test module (RTM) to create a data test route table (DTRT) from a route table and test said DTRT using simulated IP traffic;
wherein said creating said DTRT comprises collecting statistics for said route table and normalizing a set of routes for said route table.

25. The testing apparatus of claim 24, wherein said collecting comprises extracting prefix length and IP subnet distributions from said route table, and assigning routes from said route table to said DTRT in accordance with said prefix length and IP subnet distributions.

* * * * *